United States Patent
Zaffaroni et al.

(10) Patent No.: US 10,501,592 B2
(45) Date of Patent: Dec. 10, 2019

(54) PROCESS FOR COLD BONDING RUBBER ON METAL SUBSTRATES

(71) Applicant: Henkel AG & Co. KGaA, Duesseldorf (DE)

(72) Inventors: Giorgio Zaffaroni, Suno (IT); Eleonora Salmoiraghi, Cerano (IT); Manuela Brusa, Cerano (IT)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/859,991

(22) Filed: Jan. 2, 2018

(65) Prior Publication Data

US 2018/0118903 A1    May 3, 2018

Related U.S. Application Data

(63) Continuation of application No. PCT/EP2016/065370, filed on Jun. 30, 2016.

(30) Foreign Application Priority Data

Jun. 30, 2015  (EP) .................................. 15174557

(51) Int. Cl.
| | |
|---|---|
| *C08J 5/12* | (2006.01) |
| *C09J 5/02* | (2006.01) |
| *C09J 163/00* | (2006.01) |
| *C08C 19/04* | (2006.01) |
| *C09J 11/06* | (2006.01) |
| *C09J 175/02* | (2006.01) |

(52) U.S. Cl.
CPC ............... *C08J 5/128* (2013.01); *C08C 19/04* (2013.01); *C09J 5/02* (2013.01); *C09J 11/06* (2013.01); *C09J 163/00* (2013.01); *C09J 175/02* (2013.01); *C08J 2321/00* (2013.01); *C08J 2463/00* (2013.01); *C08J 2475/02* (2013.01); *C09J 2205/306* (2013.01); *C09J 2400/166* (2013.01); *C09J 2421/008* (2013.01); *C09J 2463/00* (2013.01)

(58) Field of Classification Search
CPC ........................................................ C08J 5/128
See application file for complete search history.

(56) References Cited

U.S. PATENT DOCUMENTS

| | | | |
|---|---|---|---|
| 4,659,779 A | 4/1987 | Bagga et al. | |
| 4,713,432 A | 12/1987 | Bagga et al. | |
| 4,734,332 A | 3/1988 | Bagga et al. | |
| 6,077,913 A * | 6/2000 | Beholz ...................... | C08F 8/06 525/337 |

FOREIGN PATENT DOCUMENTS

| | | | | |
|---|---|---|---|---|
| DE | 3233505 A1 * | 3/1984 | .............. | C08J 5/124 |
| DE | 3233505 A1 | 3/1984 | | |
| EP | 0129069 A2 | 12/1984 | | |
| WO | 2006086828 A1 | 8/2006 | | |
| WO | 2013026865 A1 | 2/2013 | | |
| WO | WO-2013026865 A1 * | 2/2013 | ............ | C09J 163/00 |

OTHER PUBLICATIONS

International Search Report for International PCT Patent Application No. PCT/EP2016/065370 dated Sep. 5, 2016.

* cited by examiner

*Primary Examiner* — Daniel H Lee
(74) *Attorney, Agent, or Firm* — James E. Piotrowski

(57) ABSTRACT

The present invention relates to a process for cold bonding elastomeric rubber substrates to non-elastomeric substrates of a different material, preferably metal, by use of a rubber treatment, preferably a primer composition and a 2k adhesive, preferably a 2k epoxy adhesive as well as the thus obtained bonded substrates.

18 Claims, No Drawings

PROCESS FOR COLD BONDING RUBBER ON METAL SUBSTRATES

The present invention relates to a process for cold bonding elastomeric rubber substrates to non-elastomeric substrates of a different material, preferably metal, by use of a rubber treatment, preferably a primer composition and a 2k adhesive, preferably a 2k epoxy adhesive as well as the thus obtained bonded substrates.

For various applications preformed parts made of elastomeric materials need to be bonded to different materials, such as glass, metals or plastics. Achieving sufficient bonding strength between those materials is challenging, as existing adhesives for non-elastomeric materials exhibit no or insufficient adhesiveness on elastomers, while known adhesives for elastomers have insufficient water and vapour resistance.

While it is possible to overcome some of the existing drawbacks by using solvent-based pressure-sensitive or heat curable adhesives, low curing temperatures are desired for most applications where adhesives are used. Low curing temperatures are desirable as they save energy as well as reduce thermal impact on the substrates. Additionally, thermal stresses due to different heat speed or thermal elongation of the substrates can be minimized.

Existing adhesives for cold bonding rubber and metal substrates are typically one component solvent based adhesives. These are however undesirable due to the high content of toxic and flammable solvents and the resulting health and safety issues.

DE 32 33 505 A1 describes a process for bonding elastomer parts to other materials by priming the elastomer with a cyanoacrylate and then using conventional adhesives, including hot melt adhesives, for the bonding.

There is thus need in the art for alternative adhesives that allow cold bonding of rubber and metal substrates without having the drawbacks of existing adhesive systems.

The present invention meets this object and provides a process for bonding rubber and metal substrates using a rubber treatment, preferably oxidizing rubber treatment, e.g. with iodine monobromide with dichlorohexane, or a primer composition, especially a cyanoacrylate-containing primer composition, and a 2k adhesive, preferably a 2K epoxy adhesive, having high green strength to provide for high initial tack.

In a first aspect, the present invention thus relates to a process for forming a bond between a first and a second substrate, wherein the first substrate is an elastomeric rubber substrate and the second substrate is a metal substrate, wherein the process comprises:

(a) applying rubber treatment, preferably oxidizing rubber treatment, preferably an iodine monobromide/dichlorohexane solution, and/or a primer composition, preferably comprising at least one cyanoacrylate, to the to-be-bonded surface of the rubber substrate;

(b) applying an adhesive composition to the to-be-bonded surface of the metal substrate, wherein the adhesive composition is a pre-mixed 2K adhesive comprising a resin formulation and a hardener formulation, preferably a 2k polyurea adhesive or a 2k epoxy adhesive, and allowing the adhesive to develop green strength;

(c) contacting the primed surface of the rubber substrate and the surface of the metal substrate with the applied adhesive under pressure to form the bond.

In a second aspect, the present invention is directed to a bonded product obtainable according to the processes described herein.

"At least one", as used herein, relates to at least one and comprises 1, 2, 3, 4, 5, 6, 7, 8, 9 or more of the referenced species.

The present invention is based on the inventors' surprising finding that by using a suitable rubber treatment, like a oxidizing rubber treatment or a primer, preferably a cyanoacrylate containing primer, and a 2K adhesive, especially a 2k polyurea adhesive or a 2k epoxy adhesive, more preferably a 2k epoxy adhesive, rubber and metal surfaces can be effectively cold bonded with high initial tack and low energy consumption, obviating the need for expensive and time-consuming fixturing or clamping equipment to hold the substrates together until final setting is achieved. The described processes yield strongly bonded substrates with the bond having good water and vapour resistance.

The rubber treatment can be a known one for a rubber surface treatment. Preferably the rubber treatment contains an oxidizing compound, like iodine monobromide or sodium hypochlorite. Preferably, the rubber treatment or primer is made by a composition which contains at least one selected from a cyanoacrylate, $H_2SO_4$, trichloroisocyanuric acid, iodine monobromide, sodium dichloroisocyanurate or sodium hypochlorite solution. More preferably the rubber treatment or primer is made by a composition which contains at least one selected from a cyanoacrylate, iodine monobromide or sodium dichloroisocyanurate or sodium hypochlorite solution, especially a cyanoacrylate or iodine monobromide. These more preferred compositions provide a higher final bond strength using the described process. Even more preferred is a rubber treatment with a 1-10 wt.-% iodine monobromide solution, preferably in dichlorohexane, or a 10 to 15 wt.-% NaCIO solution. Most preferred is that the primer contains at least a cyanoacrylate, leading to superior bond strength.

In various embodiments of the described processes, the cyanoacrylate used for priming the rubber surface is a preferably a slow cure cyanoacrylate. The slow cure cyanoacrylate preferably is a 2-cyanoacrylate ester of Formula (I)

$$H_2C=C(CN)-COOR \qquad (I),$$

wherein R is selected from the group consisting of $C_{1-20}$ alkyl optionally substituted with halogen, preferably methyl, ethyl, n-pentyl, n-hexyl, and 1,1,1-trifluoroisopropyl, $C_{2-16}$ alkenyl or alkynyl group, preferably propenyl and propynyl, $C_{5-8}$ cycloalkyl, preferably cyclohexyl, $C_{6-14}$ aryl, preferably phenyl, alkylaryl, preferably benzyl, alkoxyalkyl, optionally substituted with halogen, such as 2-(2,2,2-trifluoroethoxy) ethyl, and acylalkyl, such as dipropyl ketone. In preferred embodiments, the cyanoacrylate is a cyanoacrylate $C_{1-4}$ alkyl ester, more preferably cyanoacrylate ethyl or methyl ester. Particularly preferred is cyanoacrylate ethyl ester.

In various embodiments, the slow cure cyanoacrylate has a fixture time of 30-600 s, preferably 60-400 s, most preferably 200-300 s, preferably on mild steel or aluminum, most preferably on aluminum. The fixture time on mild steel is preferably 100-600 s, more preferably 150-300 s, most preferably 210-240 s. The fixture time is equivalent to the time required for 1-inch wide lap shears bonded with a ½ inch overlap to support a 3-kg weight in shear mode for at least 5 seconds.

The primer composition may, in addition to the preferred cyanoacrylate, comprise additional components, including but not limited to solvents, filler, thickeners and the like. In various embodiments, the primer composition comprises an organic solvent, such as halogenated alkanes, preferably 1,6-dichlorohexane. Such organic solvents are typically comprised in the primer composition in amounts of up to 40 wt.-% relative to the primer composition. In some embodiments, the primer composition comprises, based on its total weight, 60-70 wt.-% cyanoacrylate and 30-40 wt.-% of a suitable organic solvent.

In a preferred embodiment, the cyanoacrylate primer contains a lewis acid, preferably $BF_3$. Such lewis acids, preferably $BF_3$ are typically comprised in the primer composition in amounts of up to 1 wt.-% relative to the primer composition, preferably 0.001 wt.-% to 0.1 wt.-%.

In some embodiments, the primer composition, preferably comprising at least one cyanoacrylate, is applied in an amount of 70-190 $g/m^2$, preferably 80-170 $g/m^2$, most preferably 90-150 $g/m^2$ cyanoacrylate to the rubber substrate. This means that it is applied in an amount that corresponds to the indicated amounts of the active substance, especially cyanoacrylate.

In another embodiment, the primer composition, preferably comprising at least one cyanoacrylate, is applied in an amount of 300-500 $g/m^2$, preferably 330-470 $g/m^2$, most preferably 350-450 $g/m^2$ cyanoacrylate to the rubber substrate. This means that it is applied in an amount that corresponds to the indicated amounts of the active substance, especially cyanoacrylate. According to the high amount the resulting bond strengths might be increased.

After application of the rubber treatment and/or primer composition, the substrate surface may be allowed to dry, in particular if the primer composition contains an organic solvent. In various embodiments, as the cyanoacrylate used is preferably a slow cure cyanoacrylate, the substrate provides for good bonding strength with the epoxy adhesives even after an extended time after application of the primer. Preferably, the substrate surface after application of the rubber treatment and/or primer composition is dried, preferred at ambient conditions, for 2-700 min, especially 10-650, most preferred 30-600 min before the substrates are contacted to form the bond. In another preferred embodiment, the primer is dried, preferred at ambient conditions, for 2 to 300 min, especially 10 to 240, most preferred 30 to 180 min before the substrates are contacted to form the bond.

The primer application, optional drying and/or, more generally, the processes described herein are preferably carried out at a relative humidity of less than 85%.

In another embodiment in step a) two rubber treatments and/or primer compositions can be applied. After application of the first rubber treatment/primer, as described above, preferably a cyanoacrylate primer or a treatment with iodine monobromide, more preferably a cyanoacrylate primer, a second primer can be applied. Preferably in step a) a first primer is applied, preferably the described cyanoacrylate primer or an iodine monobromide solution, more preferably a cyanoacrylate primer, and, preferably after drying the first primer, a second primer is applied to the to-be-bonded surface of the rubber substrate. The second primer is preferably an adhesive composition, more preferably a urethane or epoxy composition, most preferably a 2k polyurea adhesive or a 2k epoxy composition, more preferably a 2k epoxy composition, preferably as described below. After applying the second primer the rubber substrate is than incubated with the primer applied thereon for 0.5-12 hours, especially for 1-10 hours, preferably for 4-8 hours before the to-be-bonded surfaces are contacted (step c)), so that the primer composition can cure.

The elastomeric rubber substrate can be made of rubber, for example be a rubber sheet, or have elastomeric rubber surface. Such rubber materials are widely known in the art and include, without limitation, natural rubber (NR), ethylene-propylene-diene rubber (EPDM), ethylene propylene rubber (EPM), acrylonitrile-butadiene rubber (NBR), polychloroprene, styrene-butadiene rubber (SBR), styrene-butadiene-styrene rubber (SBS), butadiene rubber (BR), isoprene rubber (IR), styrene ethylene butylene styrene rubber (SEBS), and all other rubbers based on copolymers of any two or more of styrene, butadiene, ethylene and isoprene.

The metal substrate can be any metal. Typically, the metals are iron, steel and aluminum as well as alloys thereof. The metal substrate may be plated with other metals, such as zinc, or may be surface-treated, such as having been subjected to a conversion treatment. The metal substrate may consist of the metal or may be surface-coated with a metal.

The 2K adhesive used in accordance with the processes described herein comprises a resin and a hardener, typically in form of separate formulation that are combined directly before application. The formulations are designed such that once combined the polymerization reaction starts and proceeds until the composition is fully cured. The curing behavior and time depend on the resins and hardeners used. In the present adhesives, it is preferred to use resins and hardeners that develop green strength before jellification. "Green strength", as used herein, relates to the ability of two surfaces to develop a bond, if pressed against each other, even before the adhesive is cured. Herein, the green strength is provided by an increase in the molecular weight of the polymer resins in a linear way to obtain high viscosity, and as a result high tack, before jellification. Beneficial for developing green strength are two different and not interfering curing reactions. The first one is a fast reaction that allows a linear growth of the polymer while increasing molecular weight. This reaction increases the viscosity without gelling the product itself and results in high tack that allows the adhesive to bond the two substrates immediately when pressed one to the other. The second reaction is a slower one and it is the final curing of the adhesive that brings the product to achieve its final properties. As measure of the green strength the floating roller peel resistance according to ASTM D 3167-03 can serve. It is preferred to use resins and hardeners that have a floating roller peel resistance according to ASTM D 3167-03 of 0.5 to 3 N/mm, preferably 1 to 2.5 N/mm, 1 to 2 N/mm, most preferably 1.3 to 1.7 N/mm, preferably after 2 hours. Preferably the resin and hardener formulation have a floating roller peel resistance of less than 0.5 N/mm, preferably less than 0.2 N/mm, most preferably less than 0.1 N/mm directly after mixing the 2 components of the 2-k adhesive. 1 h after mixing the formulations have preferably a floating roller peel resistance of 0.5-1 N/mm, 2 h after mixing preferably 0.7-2.0 N/mm, and 4 h after mixing preferably 1.7-3.5 N/mm.

Preferably the 2K adhesive developing green strength is a 2k epoxy adhesive, comprising an epoxy resin formulation and a hardener formulation, or a 2k urethane adhesive, especially a polyurea adhesive, comprising an amine formulation and an isocyanate formulation. Most preferred is a 2k epoxy adhesive.

In the epoxy resin formulation of the 2K epoxy adhesive, the epoxy resins may include any commonly known and used epoxy resin. Suitable epoxy resins preferably include epoxy resins with 1 to 10 epoxy groups per molecule. These epoxy groups can be 1,2-epoxy groups. The epoxy resin can in principle be a saturated, unsaturated, cyclic or acyclic, aliphatic, alicyclic, aromatic or heterocyclic polyepoxide compound. Examples of suitable epoxy resins include polyglycidyl ethers, commonly prepared by reacting epichlorohydrin or epibromohydrin with a polyphenol in the presence of alkali as well as polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins. Polyphenols suitable for this purpose include, for example, resorcinol, pyrocatechol, hydroquinone, bisphenol A (2,2-bis(4-hydroxyphenyl)propane), bisphenol F (bis(4-hydroxy-phenyl)methane), 1,1-bis(4-hydroxyphenyl)isobutane, 4,4'-dihydroxybenzophenone, 1,1-bis(4-hydroxyphenyl)-ethane, 1,5-hydroxynaphthalene. Likewise, suitable are diglycidyl ethers of ethoxylated resorcinol (DGER), e.g., from Indspec Chemical Corporation, and diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol M, bisphenol S, tetramethylbiphenol; diglycidyl ethers of alkylene glycols with 2 to 20 carbon atoms and poly(ethylene oxide) or poly(propylene oxide) glycols.

Additional suitable epoxy resins are the polyglycidyl ethers of polyalcohols or diamines. These polyglycidyl ethers are derived from polyalcohols such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Still other suitable epoxy resins are polyglycidyl esters of polycarboxylic acids, examples being reaction products of glycidol or epichlorohydrin with aliphatic or aromatic polycarboxylic acids such as oxalic acid, succinic acid, glutaric acid, terephthalic acid or dimer fatty acid.

Further suitable epoxy resins are derived from the epoxidation products of olefinically unsaturated cycloaliphatic compounds or from natural oils and fats.

In preferred embodiments, the epoxy resins have 1 to 10 epoxy groups and are selected from the group consisting of diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol M, bisphenol S, tetramethylbiphenol, diglycidyl ethers of alkylene glycols with 2 to 20 carbon atoms and poly(ethylene oxide) or poly(propylene oxide); polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof, preferably diglycidyl ethers of bisphenol F and diglycidyl ethers of bisphenol A and any combination thereof.

Particular preference is given to the epoxy resins which are derived from the reaction of bisphenol A or bisphenol F and epichlorohydrin. It can be advantageous to use liquid epoxy resins, the liquid epoxy resins preferably being based on bisphenol A and having a sufficiently low molecular weight. The epoxy resins which are liquid at room temperature generally have an epoxide equivalent weight of from 150 g/mol to about 220 g/mol; particular preference is given to an epoxy equivalent weight range of from 182 to 192. Such epoxy resins are commercially available under the tradename DER 331P from Dow.

The epoxy resin may alternatively or additionally comprise epoxy-phenoxy resins, such as epoxy resins modified with phenoxy. These resins are typically highly viscous liquids. Particularly preferred are bisphenol A epoxy resins modified with phenoxy. Such resins are commercially available from InChem under the tradename LER-HH.

In some embodiments, the epoxy resin formulation comprises relative to its total weight about 30-50 wt.-% of a liquid epoxy resin, preferably an epoxy resins derived from the reaction of bisphenol A and epichlorohydrin, and 40-70 wt.-% of a phenoxy-modified epoxy resin, such as a bisphenol A-epichlorohydrin derived epoxy resin modified with phenoxy (PKHH).

The hardener formulation of the 2k epoxy adhesive, in various embodiments, comprises compounds that are capable of cross-linking with epoxy groups on the epoxy resin. Any hardener suitable for a 2K epoxy may be used. Preferred hardeners include mercaptans, oligomeric amines and polymeric amines (polyamines), polymeric amides (polyamides) (including, e.g., polyamidoamines), low molecular weight amines, and combinations thereof. Also preferred are adducts of the afore-mentioned hardeners with epoxy resins such as those described above. As the adhesives of the present invention are designed to provide high green strength before jellification, the hardeners are selected such that they react with the epoxy resins such that the molecular weight of the polymer linearly increases, meaning they are preferably di-functional chain extension agents, i.e. difunctional amines, amides and mercaptans.

In various embodiments, preferred polyamines include a polyetheramine or a polyetheramine-epoxy adduct, preferably a polyetheramine-epoxy adduct, that is, a reaction product of a stoichiometric excess of an amine prepolymer with an epoxy resin. Polyamine hardeners tend to react more slowly than low molecular weight amines, but can add flexibility to the cured adhesive. The amine prepolymer used for adduct formation may be any amine prepolymer that has at least two amine groups in order to allow cross-linking to take place. The amine prepolymer comprises primary and/or secondary amine groups, and preferably comprises primary amine groups. Suitable amine prepolymers include polyether diamines and polyether triamines, and mixtures thereof. Polyether diamines are preferred. The polyether amines may be linear, branched, or a mixture. Branched polyether amines are preferred. Any molecular weight polyetheramine may be used, with molecular weights in the range of 200-6000 or above being suitable. Molecular weights may be above 1000, or more preferably above 3000. Molecular weights of 3000 or 5000 are preferred. If not further specified, the molecular weight is the weight average molecular weight measured by GPC against a polystyrene standard.

Suitable commercially available polyetheramines that can be used for adduct formation or as such include 4,7,10-Trioxa-1,13-tridecanediamine (TTD) and those sold by Huntsman under the Jeffamine® trade name. Suitable polyether diamines include Jeffamines in the D, ED, and DR series. These include Jeffamine D-230, D-400, D-2000, D-4000, HK-511, ED-600, ED-900, ED-2003, EDR-148, and EDR-176. Suitable polyether triamines include Jeffamines in the T series. These include Jeffamine T-403, T-3000, and T-5000. Polyether diamines are preferred, and polyether diamine of molecular weight about 400 (e.g. Jeffamine D-400) is most preferred. The equivalents of any of the above may also be used in partial or total replacement.

When a polyamide is included, any polyamide hardener may be used. Some preferred polyamides include reaction products of a dimerized fatty acid and a polyamine. Examples of such polyamides include those available from BASF under the trade designations Versamid® 115, Versamid® 125 and Versamid® 140.

Suitable mercaptans include difunctional mercaptans, such as 1,8-dimercapto-3,6-dioxaoctane (DMDO), either as monomers or as epoxy adducts, that is, reaction products of a stoichiometric excess of the mercaptan with an epoxy resin. Particularly preferred are difunctional mercaptan-epoxy resin adducts.

In all the above described adducts, the epoxy resin can be any of the above described epoxy resins, but preferably is a bisphenol diglycidyl ether, such as reaction products of bisphenol A with epichlorohydrin.

Any amount of the described hardeners may be used in the present invention. Preferred are polyetheramines, in particular difunctional polyetheramines such as the above-described Jeffamines, that are, in preferred embodiments, present in an amount greater than 10 wt.-%, more preferably greater than 15 wt.-%. Preferably, the amount is however less than 50 wt.-%, more preferably less than 40 wt.-%. The weight percents are expressed in terms of the hardener composition where the polyamine is included. The hardener preferably further comprises a mercaptane-epoxy adduct, preferably an adduct of DMDO and an epoxy resin. These mercaptan adducts are preferably present in an amount of up to 90 wt.-%, typically in amounts of between 70 and 85 wt.-% relative to the hardener composition.

The hardener composition may further comprise a low molecular weight (non-polymeric) amine hardener. Preferred compounds include primary and/or secondary amines having molecular weights up to 300 g/mol, 250 g/mol or 200 g/mol.

In a preferred embodiment the hardener formulation of the 2k epoxy adhesive comprises at least one difunctional mercaptan and/or mercaptane-epoxy adduct and at least one selected from the group consisting of polyamines, polyamides, low molecular weight amines, and combinations thereof.

In the hardener composition, preferably one or more curing accelerators (catalysts) are used, to speed up setting of the adhesive. The curing accelerator preferably works by catalyzing the reaction between the polyamine/polyamide/mercaptan hardeners on the one hand, with the epoxy resin on the other hand. The curing accelerator preferably includes a tertiary amine. A preferred example is 2,4,6-tris(dimethylaminomethyl)phenol, available from BASF under the name Versamine® EH30. Other suitable polyamines are described in U.S. Pat. No. 4,659,779 (and its family members U.S. Pat. Nos. 4,713,432 and 4,734,332; and EP-A-0 197 892).

The curing accelerator may be present in any amount that suitably accelerates curing of the epoxy adhesive. Preferably, a curing accelerator may be present in amounts of less than 5 wt.-%, more preferably between 0.5 and 2 wt.-% based on weight of the hardener composition.

The curing accelerator and hardeners should be used in suitable proportions and amounts to decrease the required curing temperature and enable the combined parts of the 2K adhesive to cure at a suitable temperature but at the same time to allow developing green strength and high tack before jellification. The curing temperature is preferably less than 60° C., or 50° C., or 40° C. The epoxy adhesive compositions preferably cure at ambient temperature, e.g., around 20° C. to 25° C. The inventive processes are therefore preferably carried out at temperatures, i.e. in a temperature range of about 15 to 40° C. It is permissible but not preferred to heat the inventive epoxy adhesive, e.g., in order to further reduce curing time or to obtain more complete curing.

"About", as used herein in relation to a numeric value, refers to the referenced value ±10% of said numeric value.

The epoxy resin formulation may have a viscosity of 50-200 Pas, preferably 90-150 Pas, most preferably 110-135 Pas. The hardener formulation may have a viscosity of 30-200 Pas, especially 50-200 Pas, preferably 80-150 Pas, most preferably 100-130 Pas. The viscosity is measured at a temperature of 25° C. with a plate-plate geometry using a gap of 250 microns and shear rate from $0.3 \text{ s}^{-1}$ to $40 \text{ s}^{-1}$.

In preferred embodiments, either the resin formulation or the hardener formulation, preferably the resin formulation, additionally comprises a curing indicator that allows monitoring the cold curing progress. Monitoring is preferably achieved by means of a color change during application. This helps the user to determine when the adhesive achieved the green strength and therefore is ready to be bonded. Preferred are inorganic or organic dyes, preferably azo compounds or azo dyes, more preferably those described in international patent publication WO 2013/026865, most preferably selected from Solvent Red 26 {1-[[2,5-dimethyl-4-[(2-methylphenyl)azo]-phenyl]azo]-2-naphthol}, Solvent Red 164 {1-[[4-[phenylazo]-phenyl]azo]-2-naphthol} and combinations thereof. These are commercially available under the tradename Automate™ Red TXL from Rohm&Haas. In preferred embodiments, these curing indicators are used in adhesive compositions that also use at least one mercaptan hardener, such as those described above.

The isocyanate formulation of the 2k polyurea adhesive, as resin formulation, preferably contains at least one isocyanate, preferably a polyisocyanate. The at least one polyisocyanate can be any suitable polyisocyanate, meaning that any compound which includes at least two isocyanate groups is within the contemplation of the present invention. It is preferable, however, that the polyisocyanate be a diisocyanate. Suitable diisocyanates include, without limitation, 1,5-naphthylene diisocyanate (NDI), 2,4'- or 4,4'-diphenylmethane diisocyanate (MDI), hydrogenated MDI (H12MDI), xylylene diisocyanate (XDI), tetramethylxylylene diisocyanate (TMXDI), di- and tetraalkylendiphenyl-methandiisocyanat, 4,4'-dibenzyl diisocyanate, 1,3- or 1,4-phenylene diisocyanate, toluene-2,4-diisocyanate (TDI), 1-methyl-2,4-diisocyanato-cyclohexane, 1,6-diisocyanato-2,2,4-trimethylhexane, 1,6-d iisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, methylenetriphenyl triisocyanate (MIT), phthalic acid-bis-isocyanato-ethyl ester, trimethylhexamethylene diisocyanate, 1,4-diisocyanatobutane, and 1,12-diisocyanatododecane.

In preferred embodiments, the polyisocyanates used are selected from methylenediphenyl diisocyanate (MDI), toluene-2,4-diisocyanate (TDI), hexamethylene diisocyanate (HDI), polymeric diphenylmethane diisocyanate (PMDI), isophorone diisocyanate (IPDI), 4,4'-methylenedicyclohexyl diisocyanate (H12MDI) and mixtures thereof. Suitable polyisocyanates are, for example, commercially available under the trademark name Desmodur® from Bayer AG (DE).

The incorporation of small amounts of isocyanate with a functionality higher than two, in particular a triisocyanate, is also contemplated and may under certain circumstances even be advantageous. Such triisocyanates can act as cross-linkers. In this case where the polyisocyanate acts as a cross-linker, polyisocyanates based on hexamethylene diisocyanate are preferred.

At least trifunctional isocyanates are polyisocyanates formed by trimerization or oligomerization of diisocyanates or by reaction of diisocyanates with low molecular weight polyfunctional hydroxyl or amino-containing compounds.

Commercially available examples are trimerization products of the isocyanates hexamethylene diisocyanate (HDI) or isophorone diisocyanate (IPDI) or adducts of diisocyanates and low molecular weight triols such as trimethylolpropane or glycerol. Examples are the isocyanurates of HDI and the isocyanurates of IPDI, commercially available under the trademark name Desmodur® N 3300 from Bayer AG and Vestanat® T 1890 from Evonik, respectively. Polyisocyanates based on HDI such as the HDI isocyanurate trimer are preferred.

Also suitable are prepolymers of the described polyisocyanates.

In principle aliphatic, cycloaliphatic or aromatic isocyanates can be used, but in some embodiments aromatic isocyanates are preferred, in other embodiments aliphatic isocyanates are preferred. More preferred is the use of at least two different polyisocyanates. In the most preferred embodiment the isocyanate formulation contains at least one aromatic polyisocyanate and at least one aliphatic polyisocyanate.

The second, or hardener formulation, for the 2k polyurethane/polyurea adhesive, may be the same as described above. Preferably the second formulation is an amine formulation to provide a 2k polyurea adhesive. The amine in the amine formulation is preferably at least one of the above described amines. The at least one amine comprised in the amine formulation may be a primary or secondary amine, aliphatic or aromatic amine, a di- or multifunctional amine, or an amine adduct, like a polyisocyante-amine adduct. Preferably the amine is a polyamine, especially a diamine. The amine formulations contains preferably at least two different amines, more preferably at least one primary amine and least one secondary amine. In another preferred embodiment, the amine formulation contains at least one adduct of an amine and an isocyanate.

In a preferred embodiment the amine formulation preferably comprises at least one oligomeric amine and at least one amine selected from the group consisting of polyamines, low molecular weight amines, prepolymers of the aforementioned with isocyanates, and combinations thereof. The second amine being different from the oligomeric amine. In a more preferred embodiment the amine formulation preferably comprising at least one polyether based diamine and at least one amine, different from the polyether based diamine, preferably being not a polyether based diamine, selected from the group consisting of polyamines, low molecular weight amines, prepolymers of the afore-mentioned with isocyanates, and combinations thereof. The oligomeric amine and/or the polyether based diamine have preferably molecular weight Mw in the range of 200-3000 g/mol, preferably between 400 to 2000 g/mol.

The amine formulation may have a viscosity of 5-150 Pas, preferably 10-100 Pas, most preferably 15-60 Pas. The isocyanate formulation may have a viscosity of 0.5-180 Pas, preferably 1.5-130 Pas, most preferably 3-90 Pas. The viscosity is measured at a temperature of 25° C. with a plate-plate geometry using a gap of 250 microns and shear rate from $0.3 \ s^{-1}$ to $40 \ s^{-1}$.

All formulations of the adhesives can comprise numerous other components, all of which are well known to those skilled in the art, including but not limited to commonly used adjuvants and additives such as, for example, fillers, plasticizers, tougheners, reactive and/or non-reactive diluents, flow agents, coupling agents (e.g. silanes), adhesion promoters, humectants, tackifiers, flame retardants, wetting agents, thixotropic and/or rheology agents (e.g., fumed silica) aging and/or corrosion inhibitors, stabilizers and/or coloring agents. Based on the requirements of the adhesive and its application and in view of the production, flexibility, strength, and adhesive bonding to the substrate, the auxiliaries and additives are incorporated in varying amounts in the composition. In various embodiments, the resin formulation comprises fillers and/or coloring agents, but typically in amounts of not more than 10 wt.-% relative to the resin formulation.

In a preferred embodiment each of the formulations of the 2k adhesives have a viscosity of less than 500 Pas, preferably 250 Pas, most preferably 200 Pas, in the event of 2k polyurea adhesive preferably less than 100 Pas. As another measure of the development of green strength the 2k adhesive show in increase in viscosity of over 50 Pas, preferably over 100, more preferably over 250 Pas, most preferably over 500 Pas after 2 h after mixing the components. Preferably the 2k adhesive show an increase in viscosity of 50 to 20000 Pas, preferably 250 to 15000 Pas, more preferably 250 to 10000 Pas after 2 h after mixing the components. The viscosity is measured at a temperature of 25° C. with a plate-plate geometry using a gap of 250 microns and shear rate from $0.3 \ s^{-1}$ to $40 \ s^{-1}$.

In some embodiments of the described processes, step (b) comprises incubating the metal substrates with the adhesive applied thereon for 0.5-10 hours, especially for 1-6 hours, preferably for 2-4 hours, preferably at ambient temperature to allow the adhesive to develop green strength. The development of green strength can thereby be monitored by use of one of the curing indicators described above in the adhesive composition, especially for 2k epoxy adhesives.

Before steps (a) and/or (b) of the described processes, the rubber and/or metal substrate surfaces are preferably cleaned to remove dirt, oil, grease etc., all of which may interfere with the bonding process. Suitable cleaning agents are well-known in the art and include Loctite® SF 7063 from Henkel.

Mixing, applying and/or dispensing of the adhesives can be accomplished using simple manual equipment or fully automated systems, all of which are known to those skilled in the art and readily available.

The step of contacting the two substrates for forming the bond under pressure can be carried out using known equipment, such as rolls, plates or other suitable equipment. In preferred embodiments, step (c) is carried out by rolling.

In various embodiments, the whole process can be automated.

As described above, the present invention also encompasses the products obtained by bonding the two substrates in the described processes.

All embodiments disclosed herein in relation to the described processes and formulations are similarly applicable to the claimed products and vice versa. All documents cited herein are hereby incorporated by reference in their entirety.

The invention is further illustrated by the following examples without being limited thereto.

EXAMPLES

Example 1

Primer Composition
 66.67 wt.-% ethyl cyanoacrylate (Loctite CA 406, Henkel), 33.33 wt.-% 1,6-dichlorohexane.
2K Epoxy Adhesive
Resin Formulation
 39.49 wt.-% DER 331 P (Bisphenol-A based epoxy resin, Dow), 59.23 wt.-% LER-HH (phenoxy-modified epoxy resin, InChem), 0.99 wt.-% Cab-O-Sil TS 720 (PDMS-treated fumed silica, Cabot), 0.3 wt.-% Automate Red BXL (curing indicator, Rohm&Haas). Viscosity 120 Pa s.

Hardener Formulation 80.04 wt.-% DMDO-DER 331 P adduct, 17.05 wt.-% Jeffamine D-400 (di-functional polyetheramine), 1.94 wt.-% Cab-O-Sil TS 720 (PDMS-treated fumed silica, Cabot), 0.97 wt.-% Versamine EH-30 (tris(dimethylaminomethyl)phenol; BASF). Viscosity 84 Pa s.

Preparation

1. Ethyl cyanoacrylate and 1,6-dichlorohexane were vigorously mixed under inert environment.
2. The components of the resin formulation as listed above were loaded into a high-speed disperser and dispersed with dynamic vacuum until a homogeneous mixture was obtained.
3. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).
2. Resin and hardener formulations were mixed. Pot life: 30 minutes
3. One coat of the mixed 2K epoxy adhesive was applied to the metal substrate.
4. The metal substrate was kept at ambient temperature until green strength had developed (2-4 hours by observing the color of the indicator)
5. The primer composition was applied to the rubber surface.
6. The rubber substrate was kept at ambient temperature until its surface was dry (at least 30 minutes).
7. Rubber and metal substrate were assembled and bonded by rolling.

The assembly was done at ambient temperature (20°) and a relative humidity less than 85%.

Roll peel after complete curing (3 days at 20° C.): 13 N/mm

Roll peel after 2 hours from assembly (green strength): 1.6 N/mm

Roll peel after 4 hours from assembly (green strength): 3.3 N/mm

Example 2

Primer Composition 96.49% Ethyl cyanoacrylate; 0.01% BF$_3$ (Boron trifluoride); 3.5% PMMA (Polymethylmetacrylate).

2K epoxy adhesive

Resin Formulation 39.49 wt.-% DER 331 P (Bisphenol-A based epoxy resin, Dow), 59.23 wt.-% LER-HH (phenoxy-modified epoxy resin, InChem), 0.99 wt.-% Cab-O-Sil TS 720 (PDMS-treated fumed silica, Cabot), 0.3 wt.-% Automate Red BXL (curing indicator, Rohm&Haas). Viscosity 120 Pa s.

Hardener Formulation 81.62 wt.-% DMDO-DER 331 P adduct, 17.39 wt.-% Jeffamine D-400 (di-functional polyetheramine), 0.99 wt-% Cab-O-Sil TS 720 (PDMS-treated fumed silica, Cabot). Viscosity 84 Pa s.

Preparation

1. Ethyl cyanoacrylate, BF$_3$ and PMMA were mixed until a homogenous mixture under inert environment.
2. The components of the resin formulation as listed above were loaded into a high-speed disperser and dispersed with dynamic vacuum until a homogeneous mixture was obtained.
3. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).
2. The primer composition was applied to the rubber surface.
3. The rubber substrate was kept at ambient temperature until its surface was dry (at least 24 hours).
4. Resin and hardener formulations were mixed. Ratio A:B 100:183 Pot life: 45 minutes
5. One coat of the mixed 2K epoxy adhesive was applied to the metal substrate.
6. The metal substrate was kept at ambient temperature until green strength had developed (2-4 hours by observing the color of the indicator)
7. Rubber and metal substrate were assembled and bonded by rolling.

The assembly was done at ambient temperature (20°) and a relative humidity less than 85%.

Roll peel after complete curing (3 days at 20° C.): 12 N/mm

Roll peel after 2 hours from assembly (green strength): 1.5 N/mm

Roll peel after 4 hours from assembly (green strength): 2 N/mm

Example 3

Primer Composition 96.49% Ethyl cyanoacrylate; 0.01% BF$_3$ (Boron trifluoride); 3.5% PMMA (Polymethylmetacrylate).

2K Epoxy Adhesive

Resin Formulation 46.06 wt.-% DER 356 P (Bisphenol-NF based epoxy resin, Dow), 8.23 wt.-% Paraloid EXL-2600 (Styrene-methyl methacrylate-butadiene copolymer), 0.01 wt.-% defoamer, 27.43 wt.-% LER-HH (phenoxy-modified epoxy resin, InChem), 1.81 wt.-% Silane A187 (Glycidoxypropyl) trimethoxysilane), 16.46% Versalink P1000-Tolane X-Flo100 prepolymer. Viscosity 45 Pa s.

Hardener Formulation 93.38% Ancamine 1922A-DER 331P adduct; 4.41% Cab-O-Sil TS 720; 2.21% Silane A1110. Viscosity 2 Pa s.

Preparation

1. Ethyl cyanoacrylate, BF$_3$ and PMMA were mixed until a homogenous mixture under inert environment.
2. The components of the resin formulation as listed above were loaded into a high-speed disperser and dispersed with dynamic vacuum until a homogeneous mixture was obtained.
3. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).
2. The primer composition was applied to the rubber surface.

3. The rubber substrate was kept at ambient temperature until its surface was dry (at least 24 hours).

4. Resin and hardener formulations were mixed. Ratio A:B 100:28 Pot life: 45 minutes 5. One coat of the mixed 2K epoxy adhesive was applied to the metal substrate.

6. The metal substrate was kept at ambient temperature until green strength had developed (2-4 hours by observing the color of the indicator)

7. Rubber and metal substrate were assembled and bonded by rolling.

The assembly was done at ambient temperature (20°) and a relative humidity less than 85%.

Roll peel after complete curing (3 days at 20° C.): 11 N/mm

Roll peel after 2.5 hours from assembly (green strength): 1.5 N/mm

Roll peel after 4 hours from assembly (green strength): 3 N/mm

Example 4

Primer Composition
SICOMET 102 (cyanoacrylate containing primer)
2K Epoxy Adhesive
Resin Formulation
39.49 wt.-% DER 331 P (Bisphenol-A based epoxy resin, Dow), 59.23 wt.-% LER-HH (phenoxy-modified epoxy resin, InChem), 0.99 wt.-% Cab-O-Sil TS 720 (PDMS-treated fumed silica, Cabot), 0.3 wt.-% Automate Red BXL (curing indicator, Rohm&Haas). Viscosity 120 Pa s.
Hardener Formulation
81.62 wt.-% DMDO-DER 331 P adduct, 17.39 wt.-% Jeffamine D-400 (di-functional polyetheramine), 0.99 wt.-% Cab-O-Sil TS 720 (PDMS-treated fumed silica, Cabot). Viscosity 84 Pa s.
Preparation 1. The components of the resin formulation as listed above were loaded into a high-speed disperser and dispersed with dynamic vacuum until a homogeneous mixture was obtained.

2. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).

2. The primer composition was applied to the rubber surface.

3. The rubber substrate was kept at ambient temperature until its surface was dry (at least 24 hours).

4. Resin and hardener formulations were mixed. Ratio A:B 100:183 Pot life: 45 minutes 5. One coat of the mixed 2K epoxy adhesive was applied to the metal substrate.

6. The metal substrate was kept at ambient temperature until green strength had developed (2-4 hours by observing the colour of the indicator)

7. Rubber and metal substrate were assembled and bonded by rolling.

The assembly was done at ambient temperature (20°) and a relative humidity less than 85%.

Roll peel after complete curing (3 days at 20° C.): 12 N/mm

Roll peel after 2 hours from assembly (green strength): 1.5 N/mm

Roll peel after 4 hours from assembly (green strength): 2 N/mm

Example 5

Primer Composition 1
96.49% Ethyl cyanoacrylate; 0.01% $BF_3$ (Boron trifluoride); 3.5% PMMA (Polymethylmetacrylate).
Primer Composition 2 (2K Epoxy Primer)
Part A: 84% DER 356; 15% Paraloid EXL-2600; 0.01% Defoamer 1244; 0.99% Silane A187.
Part B: 3% Cab-o-Sil TS 720; 1% Versamine EH30; 0.01% Defoamer 1244; 95.99% DER331P-Ancamine 1922A adduct.
2K Epoxy Adhesive
Resin Formulation
39.49 wt.-% DER 331 P (Bisphenol-A based epoxy resin, Dow), 59.23 wt.-% LER-HH (phenoxy-modified epoxy resin, InChem), 0.99 wt.-% Cab-O-Sil TS 720 (PDMS-treated fumed silica, Cabot), 0.3 wt.-% Automate Red BXL (curing indicator, Rohm&Haas). Viscosity 120 Pa s.
Hardener Formulation
81.62 wt.-% DMDO-DER 331 P adduct, 17.39 wt.-% Jeffamine D-400 (di-functional polyetheramine), 0.99 wt.-% Cab-O-Sil TS 720 (PDMS-treated fumed silica, Cabot). Viscosity 84 Pa s.
Preparation 1. Ethyl cyanoacrylate, $BF_3$ and PMMA were mixed until a homogenous mixture under inert environment.

2. The components of the primer 2, part A as listed above were loaded into a high-speed disperser and dispersed with dynamic vacuum until a homogeneous mixture was obtained.

3. The components of the primer 2, part B as listed above were loaded into a high-speed disperser and dispersed with dynamic vacuum until a homogeneous mixture was obtained.

4. The components of the resin formulation as listed above were loaded into a high-speed disperser and dispersed with dynamic vacuum until a homogeneous mixture was obtained.

5. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).

2. The primer composition 1 was applied to the rubber surface.

3. The rubber substrate was kept at ambient temperature until its surface was dry (at least 24 hours).

4. For primer 2, part A and B were mixed. Ratio A:B 100:50

5. Primer 2 was applied to the rubber surface already coated with primer 1 and primer 2 was cured at ambient conditions for 6 hours.

6. Resin and hardener formulations were mixed. Ratio A:B 100:183 Pot life: 45 minutes 7. One coat of the mixed 2K epoxy adhesive was applied to the metal substrate.

8. The metal substrate was kept at ambient temperature until green strength had developed (2-4 hours by observing the color of the indicator)

9. Rubber and metal substrate were assembled and bonded by rolling.

The assembly was done at ambient temperature (20°) and a relative humidity less than 85%.

Roll peel after complete curing (3 days at 20° C.): 13 N/mm

Roll peel after 2 hours from assembly (green strength): 1.5 N/mm

Roll peel after 4 hours from assembly (green strength): 2 N/mm

Example 6

Primer Composition

5% Iodine Monobromide (IBr); 95% 1,6-Dichlorohexane (DCH).
2K Epoxy Adhesive
Resin Formulation 39.49 wt.-% DER 331 P (Bisphenol-A based epoxy resin, Dow), 59.23 wt.-% LER-HH (phenoxy-modified epoxy resin, InChem), 0.99 wt.-% Cab-O-Sil TS 720 (PDMS-treated fumed silica, Cabot), 0.3 wt.-% Automate Red BXL (curing indicator, Rohm&Haas). Viscosity 120 Pa s.
Hardener Formulation 81.62 wt.-% DMDO-DER 331 P adduct, 17.39 wt.-% Jeffamine D-400 (di-functional polyetheramine), 0.99 wt.-% Cab-O-Sil TS 720 (PDMS-treated fumed silica, Cabot). Viscosity 84 Pa s.
Preparation 1. Iodine Monobromide and 1,6-Dichlorohexane were mixed
2. The components of the resin formulation as listed above were loaded into a high-speed disperser and dispersed with dynamic vacuum until a homogeneous mixture was obtained.
3. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).
2. The primer composition was applied to the rubber surface by placing a piece of cloth over the rubber surface, applying the primer composition to the cloth and placing a plastic foil over the impregnated cloth.
3. The rubber substrate was kept for at least 15 minutes before the plastic foil and the cloth was removed.
4. Resin and hardener formulations were mixed. Ratio A:B 100:183 Pot life: 45 minutes
5. One coat of the mixed 2K epoxy adhesive was applied to the metal substrate.
6. The metal substrate was kept at ambient temperature until green strength had developed (2-4 hours by observing the color of the indicator)
7. Rubber and metal substrate were assembled and bonded by rolling.

The assembly was done at ambient temperature (20°) and a relative humidity less than 85%.

Roll peel after complete curing (3 days at 20° C.): 10 N/mm

Roll peel after 2 hours from assembly (green strength): 1.5 N/mm

Roll peel after 4 hours from assembly (green strength): 2 N/mm

Example 7

Primer Composition

5% Iodine Monobromide (IBr); 95% 1,6-Dichlorohexane (DCH).
2K polyurea adhesive:
Amine Formulation 72.43 wt.-% Versalink P-1000 (Polytetramethlyeneoxide-di-p-aminobenzoate), 7.24 wt.-% Monarch 580, 3.62 wt.-% Cab-O-Sil TS 720 (PDMS-treated fumed silica, Cabot), 16.71 wt.-% (Tolonate XFlo100+Ethacure 420) adduct (aliphatic polyisocyanate—bis(sec-butylamino)diphenylmethane adduct). Viscosity 15 Pa s.
Hardener Formulation 13.91 wt.-% Tolonate HDT (hexamethylene diisocyanate), 53.08 wt.-% Macroplast QR88 (polyurethane prepolymer), 30.06 wt.-% Desmodur VK5 (Diphenylmethanediisocyanate/MDI), 2.95 wt.-% Silquest A187. Viscosity 3 Pa s.
Preparation 1. Iodine Monobromide and 1,6-Dichlorohexane were mixed
2. The components of the polyurea formulation as listed above were loaded into a high-speed disperser and dispersed with dynamic vacuum until a homogeneous mixture was obtained.
3. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).
2. The primer composition was applied to the rubber surface by placing a piece of cloth over the rubber surface, applying the primer composition to the cloth and placing a plastic foil over the impregnated cloth.
3. The rubber substrate was kept for at least 15 minutes before the plastic foil and the cloth was removed.
4. Mix part A and B, ratio A:B 100:42 Pot life: 45 min
5. One coat of the mixed 2K polyurea adhesive was applied to the metal substrate.
6. The metal substrate was kept at ambient temperature until green strength had developed (4-6 hours)
7. Rubber and metal substrate were assembled and bonded by rolling.

The assembly was done at ambient temperature (20°) and a relative humidity less than 85%.

Roll peel after complete curing (3 days at 20° C.): 8 N/mm

Roll peel after 4 hours from assembly (green strength): 1.5 N/mm

Roll peel after 6 hours from assembly (green strength): 2 N/mm

Roll peel after 8 hours from assembly (green strength): 3.5 N/mm

Example 8

Primer Composition

5% Iodine Monobromide (IBr); 95% 1,6-Dichlorohexane (DCH).
2K Polyurea Adhesive
Amine Formulation 81.27 wt.-% Versalink P-1000 (Polytetramethlyeneoxide-di-p-aminobenzoate), 8.13 wt.-% Monarch 580, 4.06 wt.-% Cab-O-Sil TS 720 (PDMS-treated fumed silica, Cabot), 6.5 wt.-% Ethacure 420). Viscosity 42 Pa s.

Hardener Formulation 9.89 wt.-% Tolonate HDT (hexamethylene diisocyanate), 87.89 wt.-% Macroplast QR88 (polyurethane prepolymer), 2.22 wt-% Silquest A187. Viscosity 80 Pa s.

Preparation

1. Iodine Monobromide and 1,6-Dichlorohexane were mixed
2. The components of the polyurea formulation as listed above were loaded into a high-speed disperser and dispersed with dynamic vacuum until a homogeneous mixture was obtained.
3. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).
2. The primer composition was applied to the rubber surface by placing a piece of cloth over the rubber surface, applying the primer composition to the cloth and placing a plastic foil over the impregnated cloth.
3. The rubber substrate was kept for at least 15 minutes before the plastic foil and the cloth was removed.
4. Mix part A and B, ratio A:B 100:108 Pot life: 40 min
5. One coat of the mixed 2K polyurea adhesive was applied to the metal substrate.
6. The metal substrate was kept at ambient temperature until green strength had developed (6-7 hours)
7. Rubber and metal substrate were assembled and bonded by rolling.

The assembly was done at ambient temperature (20°) and a relative humidity less than 85%.

Roll peel after complete curing (3 days at 20° C.): 6 N/mm

Roll peel after 6 hours from assembly (green strength): 1.5 N/mm

Roll peel after 7 hours from assembly (green strength): 2.8 N/mm

Example 9

Primer Composition 1

5% Iodine Monobromide (IBr); 95% 1,6-Dichlorohexane (DCH).

Primer Composition 2 (2K Polyurea Primer)

Amine Formulation 86.96 wt.-% Versalink P-1000 (Polytetramethlyeneoxide-di-p-aminobenzoate), 8.7 wt.-% Monarch 580, 4.34 wt.-% Cab-O-Sil TS 720 (PDMS-treated fumed silica, Cabot).

Hardener Formulation 14.07 wt.-% Tolonate HDT (hexamethylene diisocyanate), 53.66 wt.-% Macroplast QR88 (polyurethane prepolymer), 2.11 wt-% Silquest A187, 30.16 wt.-% Desmodur VK5 (Diphenylmethanediisocyanate/MDI)

2K Epoxy Adhesive

Resin Formulation 39.49 wt.-% DER 331 P (Bisphenol-A based epoxy resin, Dow), 59.23 wt.-% LER-HH (phenoxy-modified epoxy resin, InChem), 0.99 wt.-% Cab-O-Sil TS 720 (PDMS-treated fumed silica, Cabot), 0.3 wt.-% Automate Red BXL (curing indicator, Rohm&Haas). Viscosity 120 Pa s.

Hardener Formulation 81.62 wt.-% DMDO-DER 331 P adduct, 17.39 wt.-% Jeffamine D-400 (di-functional polyetheramine), 0.99 wt.-% Cab-O-Sil TS 720 (PDMS-treated fumed silica, Cabot). Viscosity 84 Pa s.

Preparation

1. Iodine Monobromide and 1,6-Dichlorohexane were mixed
2. The components of the polyurea formulation as listed above were loaded into a high-speed disperser and dispersed with dynamic vacuum until a homogeneous mixture was obtained.
3. The components of the hardener formulation as listed above were loaded into a high-speed disperser and dispersed with dynamic vacuum until a homogeneous mixture was obtained.
4. The components of the resin formulation as listed above were loaded into a high-speed disperser and dispersed with dynamic vacuum until a homogeneous mixture was obtained.
5. The components of the hardener formulation as listed above were loaded into a high-speed disperser and dispersed with dynamic vacuum until a homogeneous mixture was obtained.

Roll Peel Assembly

1. Dirt, grease, oil and the like were removed from the substrate surfaces with Loctite SF 7063 (Henkel).
2. 2. The primer composition was applied to the rubber surface by placing a piece of cloth over the rubber surface, applying the primer composition to the cloth and placing a plastic foil over the impregnated cloth.
3. The rubber substrate was kept for at least 15 minutes before the plastic foil and the cloth was removed.
4. For primer 2, part A and B were mixed. Ratio A:B 100:41
5. Primer 2 was applied to the rubber surface already coated with primer 1 and primer 2 was cured at ambient conditions for 6 hours.
6. Resin and hardener formulations were mixed. Ratio A:B 100:183 Pot life: 45 minutes
7. One coat of the mixed 2K epoxy adhesive was applied to the metal substrate.
8. The metal substrate was kept at ambient temperature until green strength had developed (2-4 hours by observing the color of the indicator)
9. Rubber and metal substrate were assembled and bonded by rolling.

The assembly was done at ambient temperature (20°) and a relative humidity less than 85%.

Roll peel after complete curing (3 days at 20° C.): 10 N/mm

Roll peel after 2 hours from assembly (green strength): 1.5 N/mm

Roll peel after 4 hours from assembly (green strength): 2 N/mm

What is claimed:

1. A process for forming a bond between a first elastomeric rubber substrate and a second metal substrate, comprising:
    providing the elastomeric rubber substrate;
    providing the metal substrate;
    applying an oxidizing rubber treatment and/or a primer composition comprising at least one cyanoacrylate to a to-be-bonded surface of the rubber substrate;
    providing a curable 2K adhesive comprising a resin component and a hardener component;
    mixing the resin component and hardener component to form a mixed 2K adhesive composition;
    applying the mixed 2K adhesive composition to a to-be-bonded surface of the metal substrate;
    incubating the applied 2K adhesive composition for 0.5 to 10 hours to develop green strength; and contacting the primed surface of the rubber substrate and the applied adhesive on the surface of the metal substrate to form the bond.

2. The process according to claim 1, wherein the 2K adhesive is selected from the group consisting of a 2k polyurea adhesive and a 2k epoxy adhesive.

3. The process according to claim 1, wherein the oxidizing rubber treatment comprises an oxidizing compound selected from the group consisting of iodine monobromide and sodium hypochlorite.

4. The process according to claim 1, wherein the cyanoacrylate is a 2-cyanoacrylate ester of Formula (I)

$$H_2C=C(CN)-COOR \quad (I),$$

wherein R is selected from the group consisting of $C_{1-20}$ alkyl optionally substituted with halogen, $C_{2-16}$ alkenyl or alkynyl group, $C_{5-8}$ cycloalkyl, $C_{6-14}$ aryl, alkylaryl, alkoxyalkyl, and acylalkyl, preferably $C_{1-4}$ alkyl, more preferably ethyl or methyl.

5. The process according to claim 1, wherein the cyanoacrylate is a 2-cyanoacrylate ester of Formula (I)

$$H_2C=C(CN)-COOR \quad (I),$$

wherein R is ethyl or methyl.

6. The process according to claim 1, wherein the cyanoacrylate is ethyl cyanoacrylate.

7. The process according to claim 1, wherein the oxidizing rubber treatment and/or the primer composition further comprises up to 40 wt.-% of an organic solvent relative to the oxidizing rubber treatment or primer composition respectively.

8. The process according to claim 1, wherein:
the 2k adhesive is a 2k epoxy adhesive;
the resin component comprises a liquid bisphenol A-based epoxy resin, optionally modified with phenoxy and/or a liquid bisphenol F-based epoxy resin, optionally modified with phenoxy; and/or
the hardener component comprises at least one difunctional mercaptan and/or at least one mercaptane-epoxy adduct and/or at least one member selected from the group consisting of polyamines, polyamides, low molecular weight amines.

9. The process according to claim 1, wherein the 2k adhesive is a 2k polyurea adhesive wherein the hardener component comprises 1) at least one oligomeric amine, and/or 2) at least one amine selected from the group consisting of polyamines, low molecular weight amines and combinations thereof, and the resin component comprises 3) at least one isocyanate containing material including at least one aliphatic isocyanate, at least one aromatic isocyanate, or isocyanate functional prepolymers of the aliphatic isocyanate or aromatic isocyanate.

10. The process according to claim 1, carried out at a temperature of 15-40° C. and a relative humidity below 85%.

11. The process according to claim 1, wherein the curable 2K adhesive comprises a curing indicator to indicate when the applied adhesive has developed sufficient green strength to contact the primed surface of the rubber substrate to the applied adhesive on the surface of the metal substrate.

12. The process according to claim 1, wherein the adhesive composition comprises a color changing azo dye.

13. The process according to claim 1, further comprising a step of cleaning the to-be-bonded surface of the rubber substrate prior to applying the oxidizing rubber treatment and/or a step of cleaning to-be-bonded surface of the metal substrate prior to applying the mixed 2K adhesive composition.

14. The process according to claim 1, wherein the primer composition is applied in an amount of 70-190 g/m² or in an amount of 300-500 g/m².

15. The process according to claim 1, further comprising a step of drying the oxidizing rubber treatment and/or a primer composition applied to the to-be-bonded surface before the step of contacting.

16. The process according to claim 1, wherein the step of incubating comprises incubating the mixed 2K adhesive composition for 0.5 to 10 hours at ambient temperature until the mixed adhesive has a floating roller peel resistance of 0.5 N/mm to 3 N/mm (ASTMD3167-03).

17. The process according to claim 1, wherein the step of contacting the primed surface of the rubber substrate and the applied adhesive on the surface of the metal substrate is carried out by rolling.

18. The process according to claim 1, wherein the step of incubating comprises incubating the mixed 2K adhesive composition for 0.5 to 10 hours at ambient temperature until the mixed adhesive has a viscosity of 250 to 15,000 Pas.

* * * * *